United States Patent [19]

Iwakiri et al.

[11] Patent Number: 5,223,597
[45] Date of Patent: Jun. 29, 1993

[54] CURABLE COMPOSITION

[75] Inventors: Hiroshi Iwakiri; Masayuki Fujita; Takashi Hasegawa, all of Hyogo, Japan

[73] Assignee: Kanegafuchi Kagaku Kogyo Kabushiki Kaisha, Osaka, Japan

[21] Appl. No.: 941,915

[22] Filed: Sep. 8, 1992

[30] Foreign Application Priority Data

Sep. 9, 1991 [JP] Japan .................. 3-228102

[51] Int. Cl.$^5$ .............................. C08G 77/12
[52] U.S. Cl. .................. 528/31; 252/182.14; 525/409; 528/33; 528/35
[58] Field of Search ............. 252/182.14; 525/409; 528/31, 33, 35

[56] References Cited

U.S. PATENT DOCUMENTS 4,302,571 11/1981 Arai et al. ............. 528/35

FOREIGN PATENT DOCUMENTS 0322857 7/1989 European Pat. Off. .
0324156 7/1989 European Pat. Off. .

OTHER PUBLICATIONS

Database WPIL, Abstract, AN 88-171026 Derwent Publications Ltd., London, GB; of JP-A-63 108 058 (Toshiba Silicone KK) May 12, 1988.

*Primary Examiner*—John Kight, III
*Assistant Examiner*—Rachel Johnson
*Attorney, Agent, or Firm*—Armstrong, Westerman, Hattori, McLeland & Naughton

[57] ABSTRACT

A curable composition comprising (A) a reactive silicon group-containing oxypropylene polymer having a ratio of $Mw^1/Mn^1$ of higher than 1.6 and (B) a reactive silicon group-containing oxypropylene polymer having a ratio of $Mw^2/Mn^2$ of not higher than 1.6 and a number-average molecular weight ($Mn^2$) of not less than the number-average molecular weight ($Mn^1$) of the oxypropylene polymer (A). A problem caused by the high viscosity of the oxypropylene polymer having a ratio of $Mw^1/Mn^1$ of higher than 1.6 can be solved and the viscosity the polymer (A) before curing can be lowered without greatly lowering excellent rubber elasticity of cured articles by mixing the polymer (A) with the oxypropylene polymer (B) having a ratio of $Mw^2/Mn^2$ of not higher than 1.6.

9 Claims, No Drawings

CURABLE COMPOSITION

FIELD OF THE INVENTION

The present invention relates to a novel curable composition comprising oxypropylene polymers having a reactive silicon group(s) (a silicon atom-containing group having one or more silicon atoms to which one or more hydroxyl groups or hydrolyzable groups are attached, i.e., a group capable of forming siloxane bond).

BACKGROUND OF THE INVENTION

Oxypropylene polymers having a reactive silicon group(s) are polymers which are capable of becoming liquid polymers and are cured in the presence of moisture at room temperature to form rubbery elastic cured articles. Accordingly, these polymers are used in the fields of elastic sealants and adhesives.

It is desirable that these polymers have an appropriate viscosity when blended or applied. Further, it is desirable that these polymers have a given molecular weight to provide cured articles having desired mechanical characteristics, particularly rubber elasticity high in flexibility.

Many methods for preparing organic polymers having a reactive silicon group(s) in the molecule have been proposed. For example, organic polymers (trade mark: MS polymer) having a main chain composed of an oxypropylene polymer and methoxysilyl groups at chain terminal positions are manufactured by Kanegafuchi Kagaku Kogyo K.K. and are commercially available.

However, there is conventionally a difficulty in manufacturing oxypropylene polymers having a narrow molecular weight distribution (Mw/Mn ratio measured by GPC is small) and a high molecular weight. Accordingly, only polymers having a wide molecular weight distribution (Mw/Mn measured by GPC is large) including oxypropylene polymers having reactive silicon group(s) have been conventionally used. These polymers have a relatively high viscosity.

It has recently been reported that an oxypropylene polymer having a narrow molecular weight distribution has been obtained [see, JP-A-1-229035 (the term "JP-A" as used herein means an "unexamined published Japanese patent application") and JP-B-46-27250 [the term "JP-B" as used herein means an "examined Japanese patent publication")]. Polymers having a main chain composed of an oxypropylene polymer having a narrow molecular weight distribution and reactive silicon groups, as terminal groups, introduced into the terminal positions of the polymer chain, have a low viscosity before curing.

The present inventors have found that when both (an oxypropylene polymer having a wide molecular weight distribution and an oxypropylene polymer having a narrow molecular weight distribution) are mixed, the viscosity of the oxypropylene polymer having a wide molecular weight distribution can be greatly lowered without reducing the excellent rubber elasticity of cured articles, and hence there can be efficiently solved a problem with regard to a high viscosity of the oxypropylene polymer having a wide molecular weight distribution and which is conventionally unfavorable to practical use. The present invention has been accomplished on the basis of this finding.

SUMMARY OF THE INVENTION

An object of the present invention is to provide a novel curable composition.

Another object of the present invention is to provide a curable composition comprising oxypropylene polymers having reactive silicon groups.

Still another object of the present invention is to provide a curable composition which is freed from a problem with regard to a high viscosity of an oxypropylene polymer having a wide molecular distribution without detriment to excellent rubber elasticity of cured articles.

The present invention provides a curable composition comprising (A) an oxypropylene polymer having a ratio $(Mw^1/Mn^1)$ of a weight-average molecular weight $(Mw^1)$ to a number-average molecular weight $(Mn^1)$ of higher than 1.6, which is an oxypropylene polymer having a polymer main chain consisting essentially of a repeating unit represented by the following formula

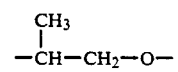

and having at least one silicon atom-containing group having one or more silicon atoms to which one or more hydroxyl groups or hydrolyzable groups are attached; and (B) an oxypropylene polymer having a ratio $(Mw^2/Mn^2)$ of a weight-average molecular weight $(Mw^2)$ to a number-average molecular weight $(Mn^2)$ of not higher than 1.6 and a number-average molecular weight $(Mn^2)$ of not less than the number-average molecular weight $(Mn^1)$ of the oxypropylene polymer (A) $(Mn^2 \geq Mn^1)$, which is an oxypropylene polymer having a polymer main chain consisting essentially of a repeating unit represented by the following formula

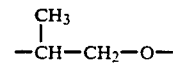

and having at least one silicon atom-containing group having one or more silicon atoms to which one or more hydroxyl groups or hydrolyzable groups are attached.

The amount (parts by weight) of the compound (A)/[the amount (parts by weight) of the component (A)+the amount (parts by weight) of the component (B)] is preferably from 0.05 to 0.95, more preferably from 0.2 to 0.8.

DETAILED DESCRIPTION OF THE INVENTION

Now, the present invention will be illustrated in more detail below.

Typical reactive silicon groups which can be used in the present invention include, but are not limited to, the following groups represented by the following general formula

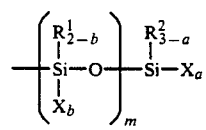

wherein $R^1$ and $R^2$ each represents an alkyl group having 1 to 20 carbon atoms, an aryl group having 6 to 20 carbon atoms, an aralkyl group having 7 to 20 carbon atoms or a triorganosiloxy group of $(R')_3SiO-$ provided that, when two or more $R^1$ or $R^2$ groups are present, two or more $R^1$ or $R^2$ groups may be the same or different; $R'$ represents a monovalent hydrocarbon group having 1 to 20 carbon atoms provided that three $R'$ groups may be the same or different; X represents a hydroxyl group or a hydrolyzable group provided that when two or more X groups are present, two or more X groups may be the same or different; a represents 0, 1, 2 or 3; b represents 0, 1 or 2; when two or more groups represented by the following formula

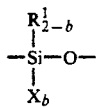

are present, b in the above formula may be the same or different; m represents an integer of 0 to 19 provided that the following relationship must be satisfied.

$$a + \Sigma b \geq 1$$

Any conventional hydrolyzable group can be used as the hydrolyzable group represented by X. Examples of the hydrolyzable groups include, but are not limited to, a hydrogen atom, a halogen atom, an alkoxy group, an acyloxy group, a ketoxymate group, an amino group, an amido group, an acid amido group, an aminoxy group, a mercapto group and an alkenyloxy group. Among them, a hydrogen atom, an alkoxy group, an acyloxy group, a ketoxymate group, an amino group, an amido group, an aminoxy group, a mercapto group and an alkenyloxy group are preferred. Particularly preferred is an alkoxy group such as methoxy group because its mild hydrolyzability and easy handleability.

One or three hydrolyzable groups or hydroxyl groups can be attached to one silicon atom, and $(a + \Sigma b)$ is preferably 1 to 5. When two or more hydrolyzable groups or hydroxyl groups are present in the reactive silicon group, they may be the same or different.

The reactive silicon group may have only one silicon atom or two or more silicon atoms. However, in the case of a reactive silicon group where silicon atoms are bonded to each other through siloxane bonds, the group may have about 20 silicon atoms.

Preferred for the purpose of the present invention are reactive silicon groups represented by the following general formula because of their ready availability:

wherein $R^2$, X and a are as defined above.

Examples of $R^1$ and $R^2$ in the above formula include an alkyl group such as methyl group or ethyl group, a cycloalkyl group such as cyclohexyl group, an aryl group such as phenyl group, an aralkyl group such as benzyl group and a triorganosiloxy group of $(R')_3SiO-$ wherein $R'$ is a methyl group or a phenyl group. $R^1$, $R^2$ and $R'$ are particularly preferably a methyl group.

One molecule of the oxypropylene polymer has at least one, preferably 1.1 to 5, reactive silicon groups. When the number of the reactive silicon groups is less than one, curability is insufficient and there is difficulty in obtaining good rubbery elastic behavior.

The reactive silicon groups may be present at the terminal positions of the molecular chain of the oxypropylene polymer, or the polymer chain may be interrupted by the reactive silicon groups. When the reactive silicon groups are present at the terminal positions of the polymer chain, a rubbery cured article having a high strength, high elongation and a low modulus can be easily obtained because the amount of the effective network structure of the oxypropylene polymer component to be finally contained in the cured article is increased.

The oxypropylene polymer in each of the components (A) and (B) has a polymer main chain comprising a repeating unit represented by the following formula

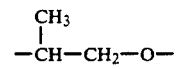

The oxypropylene polymer may be linear or may have branched chains. The polymers may be a mixture of a linear polymer and a branched polymer. The oxypropylene polymers may have other monomer units. However, it is preferred that at least 50% by weight, more preferably at least 80% by weight of monomer units in the polymer is composed of the monomer unit which forms the polymer main chain comprising the abovedescribed repeating unit.

It is preferred that the oxypropylene polymer having at least one reactive silicon group used as component (A) is prepared by introducing a reactive silicon group(s) into an oxypropylene polymer having one or more functional groups.

It is preferred that the reactive oxypropylene polymer having a ratio of $Mw^2/Mn^2$ of not higher than 1.6 and a high number-average molecular weight used as the component (B) is prepared by introducing a reactive silicon group(s) into an oxypropylene polymer.

The oxypropylene polymer having one or more functional groups can be obtained by the ring opening polymerization of the corresponding propylene oxide. Examples of the polymerization method of propylene oxide include:

(a) a method wherein an alkali catalyst such as NaOH, KOH, a sodium alkoxide or a potassium alkoxide is used; and (b) a method wherein a metal catalyst such as an aluminum porphyrin complex or a double metal cyanide complex is used.

Further, the oxypropylene polymer can be obtained by (c) a method wherein an oxypropylene polymer obtained by polymerization is reacted with a compound having at least two functional groups capable of reacting with the terminal groups of the oxypropylene polymer.

Among these methods, the method (b) is advantageously used because an oxypropylene polymer having a high molecular weight cannot be obtained by the method (a), and the molecular weight distribution of an oxypropylene polymer having a high molecular weight obtained by the method (c) is apt to be widened.

The introduction of the reactive silicon groups into the polymer can be made by conventional methods. Examples of such methods include the following methods.

(1) An oxypropylene polymer having functional groups such as hydroxyl groups at the terminal positions thereof is reacted with an organic compound having an unsaturated group and an active group reactive with the functional groups, and the resulting reaction product is reacted with a hydrosilane having a hydrolyzable group by hydrosilylation.

(2) An oxypropylene polymer having functional groups (hereinafter referred to as Y functional group) such as hydroxyl groups, epoxy groups or isocyanate groups at the chain terminal positions thereof is reacted with a compound having a reactive silicon group(s) and a functional group (hereinafter referred to as Y' functional group) reactive with the Y functional group.

Examples of the compound having a Y' functional group and a reactive silicon group(s) include, but are not limited to, amino group-containing silanes such as γ-(2-aminoethyl)aminopropyltrimethoxysilane, γ-(2-aminoethyl)aminopropylmethyldimethoxysilane and γ-aminopropyltriethoxysilane; mercapto group-containing silanes such as γ-mercaptopropyltrimethoxysilane and γ-mercaptopropylmethyldimethoxy silane; epoxysilanes such as γ-glycidoxypropyltrimethoxysilane and β-(3,4-epoxycyclohexyl)-ethyltrimethoxysilane; vinyl type unsaturated group-containing silanes such as vinyltriethoxysilane, γ-methacryloyloxypropyltrimethoxysilane and γ-acryloyloxypropylmethyldimethoxysilane; chlorine atom-containing silanes such as γ-chloropropyltrimethoxysilane; isocyanate group-containing silanes such as γ-isocyanatopropyltriethoxysilane and γ-isocyanatopropylmethyldimethoxysilane; and hydrosilanes such as methyldimethoxysilane, trimethoxysilane and methyldiethoxysilane.

In the above-described methods, there is preferred the method (1) or the method (2) wherein a polymer having hydroxyl groups at the chain terminal positions thereof is reacted with a compound having an isocyanate group and a reactive silicon group(s) from the viewpoint of easy synthesis.

The reactive silicon group-containing oxypropylene polymer used as the component (A) has a number-average molecular weight ($Mn^1$) of preferably at least 4,000, more preferably at least 8,000 from the viewpoint of providing a cured article having rubber elasticity.

The reactive silicon group-containing oxypropylene polymer used as the component (A) has a ratio of $Mw^1/Mn^1$ of higher than 1.6 and a high viscosity before curing, and hence the polymer has disadvantages in that there is a limitation with regard to a blending operation, and workability is sometimes lowered. When a polymer having a ratio of $Mw^1/Mn^1$ of not lower than 1.8 is used as the component (A), the effect of the present invention is remarkable.

The reactive silicon group-containing oxypropylene polymer used as the component (B) has a ratio of $Mw^2/Mn^2$ of not higher than 1.6 and a narrow molecular weight distribution. The number-average molecular weight ($Mn^2$) is not less than the number average molecular weight ($Mn^1$) of the polymer used as the component (A). $Mn^2$ is preferably not more than 3 times, more preferably not more than twice as much as $Mn^1$. The ratio of $Mw^2/Mn^2$ is preferably not higher than 1.5, more preferably not higher than 1.4. A polymer having a narrow molecular weight distribution has a low viscosity before curing and is easy to handle, even though the polymer has a high number average molecular weight.

The molecular weight distribution can be measured by various methods, but it is generally measured by means of gel permeation chromatography (GPC).

When the reactive silicon group-containing oxypropylene polymer of the component (A) is mixed with the reactive silicon group-containing oxypropylene polymer of the component (B), the viscosity of the resulting curable composition containing both components before curing is lowered to a level which is lower than the viscosity of the component (A). When the component (A) is mixed with the component (B) in an appropriate ratio, the viscosity of the resulting composition can be set to a value which is preferred from the viewpoints of blending operation and the handleability of the blend.

Further, cured articles obtained from the composition comprising a mixture of them does not cause a lowering in the rubber elasticity of the cured article obtained from the component (A) alone, since the number-average molecular weight ($Mn^2$) of the polymer of the component (B) is not less than the number average molecular weight ($Mn^1$) of the polymer of the component (A).

Though there is no particular limitation with regard to the mixing ratio of the component (A) and the component (B), the amount (parts by weight) of the component (A)/[the amount (parts by weight) of the component (A)+the amount (parts by weight of the component (B)] is preferably from 0.05 to 0.95, more preferably from 0.1 to 0.9 from the viewpoint of lowering the viscosity.

The composition of the present invention can be cured without using any curing catalyst. However, the composition of the present invention may be cured in the presence of a curing catalyst. When the composition of the present invention is to be cured in the presence of a curing catalyst, any of conventional curing catalysts can be used. Examples of the curing catalysts which can be used in the present invention include titanates such as tetrabutyl titanate and tetrapropyl titanate; tin salts of carboxylic acids such as dibutyltin dilaurate, dibutyltin maleate, dibutyltin diacetate, tin octylate and tin naphthenate; reaction products of dibutyltin oxide with phthalic esters; dibutyltin diacetylacetonate; organoaluminum compounds such as aluminum trisacetylacetonate, aluminum trisethylacetoacetate and diisopropoxyaluminum ethylacetoacetate; chelate compounds such as zirconium tetraacetylacetonate and titanium tetraacetylacetonate; lead octylate; amine compounds such as butylamine, octylamine, laurylamine, dibutylamine, monoethanolamine, diethanolamine, triethanolamine, diethylenetriamine, triethylenetetramine, oleylamine, cyclohexylamine, benzylamine, diethylaminopropylamine, xylylenediamine, triethylenediamine, guanidine, diphenylguanidine, 2,4,6-tris(dimethylaminomethyl)-phenol, morpholine, N-methylmorpholine, 2-ethyl-4-methylimidazole and 1,8-diazabicyclo(5.4.0)-undecene-7 (DBU) and salts of these amine compounds with carboxylic acids; low-molecular polyamide resins obtained from an excess amount of a polyamine and a polybasic acid; reaction products of an excess amount of a polyamine with an epoxy compound; silane coupling agents having an amino group such as γ-aminopropyltrimethoxysilane and N-(β-aminoethyl)aminopropylmethyldimethoxysilane; and other conventional silanol condensation catalysts, acid catalysts and basic catalysts. These catalysts may be used either alone or in combination of two or more of them.

These curing catalysts are used in an amount of preferably 0.1 to 20 parts (by weight; the same applies hereinbelow), more preferably 1 to 10 parts based on 100 parts of the oxypropylene polymer having at least one reactive silicon group. When the amount of the curing catalyst to the oxypropylene polymer having at least one reactive silicon group is too small, the curing rate is retarded or the curing reaction proceeds insufficiently, while, when the amount of the curing catalyst is too large, heat generation or foaming locally occurs during curing and there is difficulty in obtaining good cured articles. Accordingly, the amount of the curing catalyst outside the range described above is not preferred.

The oxypropylene polymer having at least one reactive silicon group can be modified by mixing various fillers. Examples of the fillers include reinforcing fillers such as fumed silica, precipitated silica, silicic anhydride, hydrated silicic acid and carbon black; fillers such as calcium carbonate, magnesium carbonate, diatomaceous earth, calcined clay, clay, talc, titanium oxide, bentonite, organic bentonite, ferric oxide, zinc oxide, active zinc flower, hydrogenated castor oil and inorganic hollow microspheres (Shirasubaloon); and fibrous fillers such as asbestos, glass fiber and filament.

When the filler is used to obtain a cured composition having a high strength, a filler selected from the group consisting of fumed silica, precipitated silica, silicic anhydride, hydrated silicic acid, carbon black, surface-treated fine calcium carbonate, calcined clay, clay and active zinc flower is mainly used in an amount of 1 to 100 parts based on 100 parts of the oxypropylene polymer having at least one reactive silicon group, whereby a favorable effect can be obtained. When a cured composition having a low strength and high elongation is to be obtained, a filler selected from the group consisting of titanium oxide, calcium carbonate, magnesium carbonate, talc, ferric oxide, zinc oxide and inorganic hollow microspheres is mainly used in an amount of 5 to 200 parts based on 100 parts of the oxypropylene polymer having at least one reaction silicon group, whereby a favorable effect can be obtained. These fillers may be used either alone or as a mixture of two or more of them. A lowering in viscosity is preferred because a large amount of the filler can be used.

Plasticizers can be effectively used together with the fillers in the curable composition of the present invention because the elongation of the cured articles can be increased or a larger amount of the filler can be mixed. Examples of the plasticizers which can be used in the present invention include phthalic esters such as dioctyl phthalate, dibutyl phthalate and butyl benzyl phthalate; aliphatic dibasic esters such as dioctyl adipate, isodecyl succinate and dibutyl sebacate; glycol esters such as diethylene glycol benzoate and pentaerythritol esters; aliphatic esters such as butyl oleate and methyl acetyl ricinoleate; phosphoric esters such as tricresyl phosphate, trioctyl phosphate and octyl diphenyl phosphate; epoxy plasticizers such as epoxidized oil and benzyl epoxystearate; polyester plasticizers such as polyesters derived from dibasic acid and a dihydric alcohol; polyethers such as polypropylene glycol and derivatives thereof; polystyrenes such as poly-α-methylstyrene and polystyrene; and other plasticizers such as polybutadiene, butadieneacrylonitrile copolymer, polychloroprene, polyisoprene, polybutene and chlorinated paraffins. These plasticizers may be used either alone or as a mixture of two or more of them. The plasticizers are used in an amount of preferably 1 to 100 parts based on 100 parts of the oxypropylene polymer having at least one reactive silicon group.

The curable composition of the present invention can be prepared, for example, by a conventional method wherein the components are kneaded at room temperature or under heating by using a mixer, rollers or a kneader, or a method wherein the components are dissolved in a small amount of an appropriate solvent and mixed without particular limitation. One-pack type or two-pack type blends can be prepared by using an appropriate combination of the components.

When the curable composition of the present invention is exposed to the air, a three-dimensional network structure is formed by the action of water in air, whereby the composition is cured to form a solid having rubbery elasticity.

Various additives such as an adhesion improver, physical property adjustor, shelf stability improver, lubricant, pigment and blowing agent may be optionally added to the curable composition of the present invention when applied.

The curable composition of the present invention is particularly useful as an elastic sealant and a sealing material and can be used as a sealing medium for building structures, marine structures, automobiles and roads. The curable composition can be used alone or as various types of sealing compositions or bonding compositions because the curable composition can be bonded to various substrates such as glass, porcelain, wood, metal and molded resin articles with the aid of primers. Further, the curable composition of the present invention is useful as food packaging materials, casting rubber materials, templating materials and coating materials.

According to the present invention, a problem with regard to the high viscosity of conventional reactive silicon group-containing oxypropylene polymer having a wide molecular weight distribution (a ratio of Mw/Mn measured by GPC being high) can be efficiently solved without lowering the excellent rubber elasticity of cured articles by mixing such polymer with a reactive silicon group containing oxypropylene polymer having a narrow molecular weight distribution (a ratio of Mw/Mn measured by GPC being low) and a high number-average molecular weight (Mn).

The invention will be better understood with reference to the following examples. It is understood, however, that the examples are intended for illustration only and it is not intended that the invention is limited thereby.

SYNTHESIS EXAMPLE 1

Into a 1.5 l pressure glass reactor was charged 401 g (0.081 equivalent) of polyoxypropylene triol (Mw/Mn=1.38, viscosity: 89 P) having a molecular weight of 15,000), and the reactor was purged with nitrogen gas.

Subsequently, 19.1 g (0.099 equivalent) of a 28% methanol solution of sodium methoxide from a dropping funnel was added dropwise thereto at 137° C. After the mixture was reacted for 5 hours, deaeration was carried out under reduced pressure. The reactor was again purged with nitrogen gas, and 9.0 g (0.118 equivalent) of allyl chloride was added dropwise thereto. After the mixture was reacted for 1.5 hours, 5.6 g (0.029 equivalent) of a 28% methanol solution of sodium methoxide and 2.7 g (0.035 equivalent) of allyl chloride were further added thereto to thereby carry out allylation.

The resulting reaction mixture was dissolved in hexane and subjected to an adsorption treatment with aluminum silicate. Hexane was then removed under reduced pressure to obtain 311 g of a yellowish transparent polymer (viscosity: 68 P).

Into a pressure glass reactor was charged 270 g (0.065 equivalent) of the polymer, and the reactor was purged with nitrogen gas. Subsequently, 0.075 ml of a solution of chloroplatinic acid catalyst (a solution of 25 g of $H_2PtCl_6.6H_2O$ dissolved in 500 g of isopropyl alcohol) was added thereto, and the mixture was stirred for 30 minutes. To the mixture, there was added 6.24 g (0.059 equivalent) of dimethoxymethylsilane from a dropping funnel, and the mixture was reacted at 90° C. for 4 hours. Deaeration was carried out to thereby obtain 260 g of a yellowish transparent polymer.

SYNTHESIS EXAMPLE 2

Into a 1.5 l pressure glass reactor was charged 381 g (0.183 equivalent) of polyoxypropylenetriol (Mw/Mn=1.1, viscosity: 11 P) having a molecular weight of 6.000, and the reactor was purged with nitrogen gas.

Subsequently, 42.5 g (0.220 equivalent) of a 28% methanol solution of sodium methoxide from a dropping funnel was added dropwise thereto. After the mixture was reacted for 5 hours, deaeration was carried out under reduced pressure. The reactor was again purged with nitrogen gas, and 28.5 g (0.372 equivalent) of allyl chloride was added dropwise thereto. After the mixture was reacted for 1.5 hours, 16.9 g (0.088 equivalent) of a 28% methanol solution of sodium methoxide and 7.9 g (0.103 equivalent) of allyl chloride were further added thereto to thereby carry out allylation.

The reaction mixture was dissolved in hexane and subjected to an adsorption treatment with aluminum silicate. Hexane was removed under reduced pressure to thereby obtain 313 g of a yellowish transparent polymer (viscosity; 10 P).

Into a pressure glass reactor was charged 270 g (0.148 equivalent) of the polymer, and the reactor was purged with nitrogen gas. Subsequently, 0.075 ml of a solution of chloroplatinic acid catalyst (a solution of 25 g of $H_2PtCl_6.6H_2O$ dissolved in 500 g of isopropyl alcohol) was added thereto, and the mixture was stirred for 30 minutes. To the mixture, there was added 14.06 g (0.132 equivalent) of dimethoxymethylsilane from a dropping funnel. After the mixture was reacted at 90° C. for 4 hours, deaeration was carried out to thereby obtain 264 g of a yellowish transparent polymer.

SYNTHESIS EXAMPLE 3

A pressure glass reactor was purged with nitrogen gas, and 420 g of polyoxypropylene glycol having a number-average molecular weight of 3.000 and 80 g of polyoxypropylenetriol having a number-average molecular weight of 3,000 were charged into the reactor. Subsequently, 40 g of sodium hydroxide was added thereto. After the mixture was reacted at 60° C. for 13 hours, 19 g of bromochloromethane was reacted at 60° C. for 10 hours (the resulting polymer had a ratio of Mw/Mn of 2.1 and a viscosity of 385 P).

Subsequently, 15 g of allyl chloride was added thereto and the mixture was reacted for 36 hours. After completion of the reaction, volatile matter was removed under reduced pressure.

The contents were taken out from the reactor, placed in a beaker, dissolved in hexane and subjected to an adsorption treatment with aluminum silicate. Hexane was then removed under reduced pressure.

A reactor was purged with nitrogen gas, and 500 g of the polymer was placed in the reactor. Subsequently, 0.03 g of a solution of chloroplatinic acid catalyst (a solution of 25 g of $H_2PtCl_6.6H_2O$ dissolved in 500 g of isopropyl alcohol) was added thereto, and 12 g of dimethoxymethylsilane was added. The mixture was reacted at 80° C. for 4 hours. After completion of the reaction, volatile matter was removed under reduced pressure to thereby obtain 500 g of a light yellowish transparent polymer.

SYNTHESIS EXAMPLE 4

A pressure glass reactor was purged with nitrogen gas, and 420 g of polyoxypropylene glycol having a number-average molecular weight of 3,000 and 80 g of polyoxypropylenetriol having a number-average molecular weight of 3,000 were charged into the reactor. Subsequently, 40 g of sodium hydroxide was added thereto. After the mixture was reacted at 60° C. for 13 hours, 15.5 g of bromochloromethane was reacted at 60° C. for 10 hours (the resulting polymer had a ratio of Mw/Mn of 1.9 and a viscosity of 88 P).

Subsequently, 19 g of allyl chloride was added thereto, and the mixture was reacted for 36 hours. After completion of the reaction, volatile matter was removed under reduced pressure.

The contents were taken out from the reactor, placed in a beaker, dissolved in hexane and subjected to an adsorption treatment with aluminum silicate. Hexane was then removed under reduced pressure.

A reactor was purged with nitrogen gas, and 500 g of the polymer was placed in the reactor. Subsequently, 0.03 g of a solution of chloroplatinic acid catalyst (a solution of 25 g of $H_2PtCl_6.6H_2O$ dissolved in 500 g of isopropyl alcohol) was added thereto, and 14 g of dimethoxymethylsilane was added. The mixture was reacted at 80° C. for 4 hours. After completion of the reaction, volatile matter was removed under reduced pressure to thereby obtain 510 g of a light yellowish transparent polymer.

The number-average molecular weight (Mn) and the molecular weight distribution (Mw/Mn) of each of the polymers obtained in Synthesis Examples 1, 2, 3 and 4 were measured by means of GPC. GPC was conducted by using a column packed with polystyrene gel (manufactured by Tosoh Co., Ltd.) eluting with tetrahydrofuran. The analysis was made at an oven temperature of 40° C. The results are shown in Table 1.

TABLE 1

| Polymer | Number-average molecular weight (Mn) | Molecular weight distribution (Mw/Mn) |
| --- | --- | --- |
| Synthesis Ex. 1 | $1.8 \times 10^4$ | 1.5 |
| Synthesis Ex. 2 | $7.8 \times 10^3$ | 1.1 |
| Synthesis Ex. 3 | $1.8 \times 10^4$ | 2.3 |
| Synthesis Ex. 4 | $7.2 \times 10^3$ | 1.8 |

EXAMPLE 1

50 parts of the polymer obtained in Synthesis Example 1 and 50 parts of the polymer obtained in Synthesis Example 3 were kneaded.

EXAMPLE 2

50 parts of the polymer obtained in Synthesis Example 1 and 50 parts of the polymer obtained in Synthesis Example 4 were kneaded.

REFERENTIAL EXAMPLE 1

50 parts of the polymer obtained in Synthesis Example 2 and 50 parts of the polymer obtained in Synthesis Example 3 were kneaded.

The viscosity at 23° C. of each of the compositions obtained in Examples 1 and 2 and Referential Example 1 was measured by using Brookfield type viscometer (BM type roller No. 4, 12 rpm). The results are shown in Table 2.

For the purpose of comparison, the viscosity at 23° C. of each of the polymers obtained in Synthesis Examples 1 to 4 (corresponding to Comparative Examples 1 to 4) were measured in the same manner as described above. The results are shown in Table 2.

TABLE 2

|  | Viscosity (poise) |
| --- | --- |
| Example 1 | 130 |
| Example 2 | 58 |
| Referential Example 1 | 120 |
| Comparative Example 1 | 88 |
| Comparative Example 2 | 16 |
| Comparative Example 3 | 380 |
| Comparative Example 4 | 45 |

It is apparent from Table 2 that the viscosity of the polymer (which is hard to handle because of a high viscosity) can be effectively adjusted to a low viscosity value.

EXAMPLE 3

50 parts of the polymer obtained in Synthesis Example 1 and 50 parts of the polymer obtained in Synthesis Example 3 were kneaded together with 3 parts of tin octylate, 0.5 part of laurylamine and 0.6 part of water. The resulting composition was molded into a sheet which was then cured.

EXAMPLE 4

50 parts of the polymer obtained in Synthesis Example 1 and 50 parts of the polymer obtained in Synthesis Example 4 were kneaded together with 3 parts of tin octylate, 0.5 part of laurylamine and 0.6 parts of water. The resulting composition was molded into a sheet which was then cured.

REFERENTIAL EXAMPLE 2

50 parts of the polymer obtained in Synthesis Example 2 and 50 parts of the polymer obtained in Synthesis Example 3 were kneaded together with 3 parts of tin octylate, 0.5 part of laurylamine and 0.6 part of water. The resulting composition was molded into a sheet which was then cured.

COMPARATIVE EXAMPLE 5

100 parts of the polymer obtained in Synthesis Example 1, 3 parts of tin octylate, 0.5 part of laurylamine and 0.6 part of water were kneaded. The resulting composition was molded into a sheet which was then cured.

COMPARATIVE EXAMPLE 6

100 parts of the polymer obtained in Synthesis Example 2, 3 parts of tin octylate, 0.5 part of laurylamine and 0.6 part of water were kneaded. The resulting composition was molded into a sheet which was then cured.

COMPARATIVE EXAMPLE 7

100 parts of the polymer obtained in Synthesis Example 3, 3 parts of tin octylate, 0.5 part of laurylamine and 0.5 part of water were kneaded. The resulting composition was molded into a sheet which was then cured.

COMPARATIVE EXAMPLE 8

100 parts of the polymer obtained in Synthesis Example 4, 3 parts of tin octylate, 0.5 part of laurylamine and 0.6 part of water were kneaded. The resulting composition was molded into a sheet which was then cured.

JIS No. 3 dumbbell specimens were prepared from the cured sheets obtained in Examples 3 and 4, Referential Example 2 and Comparative Examples 5 to 8. A tensile test was carried out to measure tensile strength at break (TB) and tensile elongation at break (EB). The results are shown in Table 3.

TABLE 3

|  | TB (kg/cm$^2$) | EB (%) |
| --- | --- | --- |
| Example 3 | 5.0 | 110 |
| Example 4 | 4.4 | 70 |
| Referential Example 2 | 3.7 | 50 |
| Comparative Example 5 | 4.8 | 75 |
| Comparative Example 6 | 3.6 | 30 |
| Comparative Example 7 | 5.0 | 100 |
| Comparative Example 8 | 3.4 | 45 |

It is apparent from Table 3 that the cured articles obtained in Examples 3 and 4 show that rubber elasticity is not greatly lowered.

While the invention has been described in detail and with reference to specific embodiments thereof, it will be apparent to one skilled in the art that various changes and modifications can be made therein without departing from the spirit and scope thereof.

What is claimed is:

1. A curable composition comprising
(A) an oxypropylene polymer having a ratio ($Mw^1/Mn^1$) of a weight-average molecular weight ($Mw^1$) to a number-average molecular weight ($Mn^1$) of higher than 1.6, which is an oxypropylene polymer having a polymer main chain consisting essentially of a repeating unit represented by the following formula

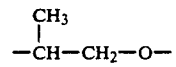

and having at least one silicon atom-containing group having one or more silicon atoms to which one or more hydroxyl groups or hydrolyzable groups are attached; and
(B) an oxypropylene polymer having a ratio ($Mw^2/Mn^2$) of a weight-average molecular weight ($Mw^2$) to a number-average molecular weight ($Mn^2$) of not higher than 1.6 and a number-average molecular weight ($Mn^2$) of not less than the number-average molecular weight ($Mn^1$) of the oxypropylene polymer (A) ($Mn^2 \geq Mn^1$), which is an oxypropylene polymer having a polymer main chain consisting essentially of a repeating unit represented by the following formula

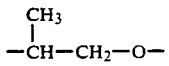

and having at least one silicon atom-containing group having one or more silicon atoms to which one or more hydroxyl groups or hydrolyzable groups are attached.

2. A curable composition as claimed in claim 1, wherein said silicon atom-containing group having one or more silicon atoms to which one or more hydroxyl groups or hydrolyzable groups are attached is a group represented by the following general formula

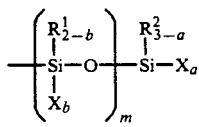

wherein $R^1$ and $R^2$ each represents an alkyl group having 1 to 20 carbon atoms, an aryl group having 6 to 20 carbon atoms, an aralkyl group having 7 to 20 carbon atoms or a triorganosiloxy group of $(R')_3SiO$— provided that, when two or more $R^1$ or $R^2$ groups are present, they may be the same or different; $R'$ represents a monovalent hydrocarbon group having 1 to 20 carbon atoms provided that three $R'$ groups may be the same or different; X is a material selected from the group consisting of a hydroxyl group and a hydrolyzable group, provided that, when two or more X groups are present, they may be the same or different; a represents 0, 1, 2 or 3; b represents 0, 1 or 2; when two or more groups represented by the following formula

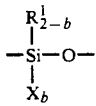

are present, b in the above formula may be the same or different; m represents an integer of 0 to 19 provided that the following relationship must be satisfied, $$a + \Sigma b \geqq 1.$$

3. A curable composition as claimed in claim 1, wherein said silicon atom-containing group is a group represented by the following general formula

wherein $R^2$ represents an alkyl group having 1 to 20 carbon atoms, an aryl group having 6 to 20 carbon atoms, an aralkyl group having 7 to 20 carbon atoms or a triorganosiloxy group of $(R')_3SiO$—; $R'$ represents a monovalent hydrocarbon group having 1 to 20 carbon atoms provided that three $R'$ groups may be the same or different; X is a material selected from the group consisting of a hydroxyl group and a hydrolyzable group, provided that, when two or more X groups are present, they may be same or different; a represent 0, 1, 2 or 3.

4. A curable composition as claimed in claim 1, wherein said oxypropylene polymer (A) has a ratio of $Mw^1/Mn^1$ of not lower than 1.8.

5. A curable composition as claimed in claim 1, wherein said oxypropylene polymer (B) has a ratio of $Mw^2/Mn^2$ of not higher than 1.5.

6. A curable composition as claimed in claim 1, wherein the amount of the component (A)/[the amount of the component (A)+the amount of the component (B)] is from 0.05 to 0.95.

7. A curable composition as claimed in claim 1, further comprising a curing catalyst in amount of from about 0.1 to about 20 parts by weight of the composition.

8. A curable composition as claimed in claim 1, further comprising, per 100 parts by weight of the oxypropylene polymer having at least one reactive silicon group, 1 to 100 parts of a filler and 1 to 100 parts of a plasticizer.

9. A curable composition as claimed in claim 1, wherein said oxypropylene polymer (A) has a number-average molecular weight $(Mn^1)$ of at least 4,000.

* * * * *